US012612198B2

(12) United States Patent
Shkolnik et al.

(10) Patent No.: US 12,612,198 B2
(45) Date of Patent: Apr. 28, 2026

(54) MOBILE ENGINE-GENERATOR VEHICLE

(71) Applicant: LiquidPiston, Inc., Bloomfield, CT (US)

(72) Inventors: Alexander Shkolnik, Wilmington, MA (US); Nikolay Shkolnik, West Hartford, CT (US); Robert L. O'Brien, Jr., Canton, CT (US); Jason Michael Deguzis, Amston, CT (US); Peter Armour, Bloomfield, CT (US); Michael Kenneth Ogden, Simsbury, CT (US)

(73) Assignee: LiquidPiston, Inc., Bloomfield, CT (US)

( * ) Notice: Subject to any disclaimer, the term of this patent is extended or adjusted under 35 U.S.C. 154(b) by 105 days.

(21) Appl. No.: 18/600,673

(22) Filed: Mar. 9, 2024

(65) Prior Publication Data

US 2024/0300681 A1    Sep. 12, 2024

Related U.S. Application Data

(60) Provisional application No. 63/489,652, filed on Mar. 10, 2023.

(51) Int. Cl.
B64U 50/33 (2023.01)
B64U 30/21 (2023.01)

(52) U.S. Cl.
CPC ............. B64U 50/33 (2023.01); B64U 30/21 (2023.01)

(58) Field of Classification Search
CPC ........ B64U 30/21; B64U 50/30; B64U 50/31; B64U 50/32; B64U 50/33; B64U 50/37;

B64D 27/35; B64D 27/355; B64D 27/357; B64D 41/00; B64D 2033/0213; B64D 2041/002; B64D 2041/005; B60L 1/006
USPC ........................................................ 244/1 R
See application file for complete search history.

(56) References Cited

U.S. PATENT DOCUMENTS

| | | | | | |
|---|---|---|---|---|---|
| 6,724,100 | B1 * | 4/2004 | Gabriel | ................... | B60L 50/16 |
| | | | | | 180/65.265 |
| 11,958,362 | B1 * | 4/2024 | Stockmeier | ............. | B60L 1/006 |
| 2012/0139335 | A1 * | 6/2012 | Holland | ................... | B60L 53/16 |
| | | | | | 307/9.1 |
| 2012/0303397 | A1 * | 11/2012 | Prosser | ................... | B60L 53/18 |
| | | | | | 705/7.12 |
| 2013/0184968 | A1 * | 7/2013 | Kumano | ................ | H02J 3/466 |
| | | | | | 307/80 |
| 2015/0060172 | A1 * | 3/2015 | Manganaro | ............. | B60L 58/10 |
| | | | | | 180/165 |

(Continued)

FOREIGN PATENT DOCUMENTS

EP            2380768 A1 * 10/2011 ............ B60W 10/30

OTHER PUBLICATIONS

International Searching Authority—International Search Report, pertaining to International Application No. PCT/US24/019287 dated Jun. 10, 2024, together with the Written Opinion of the International Searching Authority, 13 pages.

*Primary Examiner* — Joshua E Rodden
(74) *Attorney, Agent, or Firm* — Merchant & Gould P.C.

(57) ABSTRACT
A mobile engine-generator vehicle that uses the same motor system for mobility as it does for electrical power generation. The mobile engine-generator vehicle is configured to provide electrical power to an external load via an electrical outlet mounted to the vehicle.

14 Claims, 5 Drawing Sheets

(56)        References Cited

U.S. PATENT DOCUMENTS

| 2016/0167799 A1 * | 6/2016 | Smaoui ..................... F02C 6/14 |
| | | 701/16 |
| 2017/0015417 A1 * | 1/2017 | Bishop ................... B64U 10/20 |
| 2017/0066531 A1 * | 3/2017 | McAdoo ................ B64D 31/18 |
| 2018/0244386 A1 * | 8/2018 | Phan ........................ G08G 5/57 |
| 2019/0047704 A1 | 2/2019 | Liu |
| 2019/0241264 A1 | 8/2019 | Phan et al. |
| 2021/0253240 A1 * | 8/2021 | Beck ..................... B64U 50/14 |
| 2023/0264823 A1 * | 8/2023 | Abron .................... B64U 10/10 |
| | | 180/7.4 |
| 2024/0025361 A1 * | 1/2024 | Salter ..................... B60R 16/03 |
| 2024/0066990 A1 * | 2/2024 | Salter ..................... B60L 50/66 |
| 2024/0199248 A1 * | 6/2024 | Al-Ahmed .............. H04W 4/40 |
| 2024/0228076 A1 * | 7/2024 | Kozlenko .............. B64U 20/40 |
| 2024/0262231 A1 * | 8/2024 | Koyanagi .............. B60L 53/62 |

* cited by examiner

MOBILE ENGINE-GENERATOR VEHICLE

CROSS-REFERENCE TO RELATED APPLICATIONS

The present application claims priority from U.S. Provisional Application No. 63/489,652, filed Mar. 10, 2023, the contents of which are hereby incorporated by reference herein in their entirety.

TECHNICAL FIELD

The present invention relates to a mobile engine-generator vehicle that uses the same motor system for mobility as it does for electrical power generation, and more particularly to a modular mobile engine-generator vehicle configured to provide electrical power to an external load via an electrical outlet mounted to the vehicle.

SUMMARY OF THE EMBODIMENTS

In accordance with one embodiment of the invention, an improved mobile engine-generator vehicle of the type having a set of rotating propulsion devices, wherein the improvement comprises: an electrical outlet, mounted to the mobile engine-generator vehicle and configured to supply electricity therethrough to an external load, and an engine-generator, comprising an engine and an alternator, configured to supply an electrical power output to the electrical outlet, and also to supply power to a member of the set of rotating propulsion devices.

In accordance with one embodiment of the invention, a mobile engine-generator vehicle comprising: a body; a set of rotating propulsion devices coupled to the body; a set of alternators, each configurable as a motor to drive the set of rotating propulsion devices; an engine configurable to drive a member selected from the group consisting of the set of rotating propulsion devices, at least one member of the set of alternators, and combinations thereof; and an electrical outlet, mounted to the body, and coupled to at least one member of the set of alternators, so as to supply electricity therethrough to an external load when the set of alternators is configured to generate electricity.

The mobile engine-generator vehicle may include a sensor coupled to the electrical outlet and configured to detect a presence of the external load on the electrical outlet; and a controller coupled to the sensor and configured to inhibit operation of the set of rotating propulsion devices if the external load has been detected as present.

The mobile engine-generator vehicle may comprise an internal rechargeable battery coupled to the electrical outlet. The electrical outlet is configured to receive electrical power from an external electrical power source, thereby recharging the internal rechargeable battery.

In some embodiments, the mobile engine-generator vehicle may comprise a human control interface coupled to a controller and configured to allow a user to select an operation mode selected from the group consisting of (i) a mode whereby the electrical outlet is configured to provide electrical power, therethrough, to the external load, (ii) a mode whereby the electrical outlet is configured to receive electrical power from the external electrical power source and deliver the received electrical power to the internal rechargeable battery; (iii) a mode whereby the engine provides power to the set of rotating propulsion devices; and (iv) a mode whereby the mobile engine-generator vehicle is powered down.

In some embodiments, the set of rotating propulsion devices is selected from the group consisting of a propeller, a rotor, a wheel, and combinations thereof.

In some embodiments, the engine is configured to drive the set of rotating propulsion devices through a clutch coupled to the engine. The clutch may be configured to be decoupled from the engine if the electrical outlet is providing electrical power to the external load.

The mobile engine-generator vehicle may be an aircraft, a watercraft, or a land vehicle. In some embodiments, the mobile engine-generator vehicle is manned. In other embodiments, the mobile engine-generator vehicle is unmanned.

In some embodiments, the mobile engine-generator vehicle comprises a siphon coupled to a fuel inlet, the fuel inlet being coupled to the engine. The siphon may be configured to siphon fuel from an external fuel source through the fuel inlet, thereby providing siphoned fuel to the engine while electrical power is provided to the external load through the electrical outlet. The fuel inlet may be coupled to the engine via an internal fuel source, for example an internal fuel tank of the mobile engine-generator vehicle.

In some embodiments, the mobile engine-generator vehicle may comprise modular components.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1A:
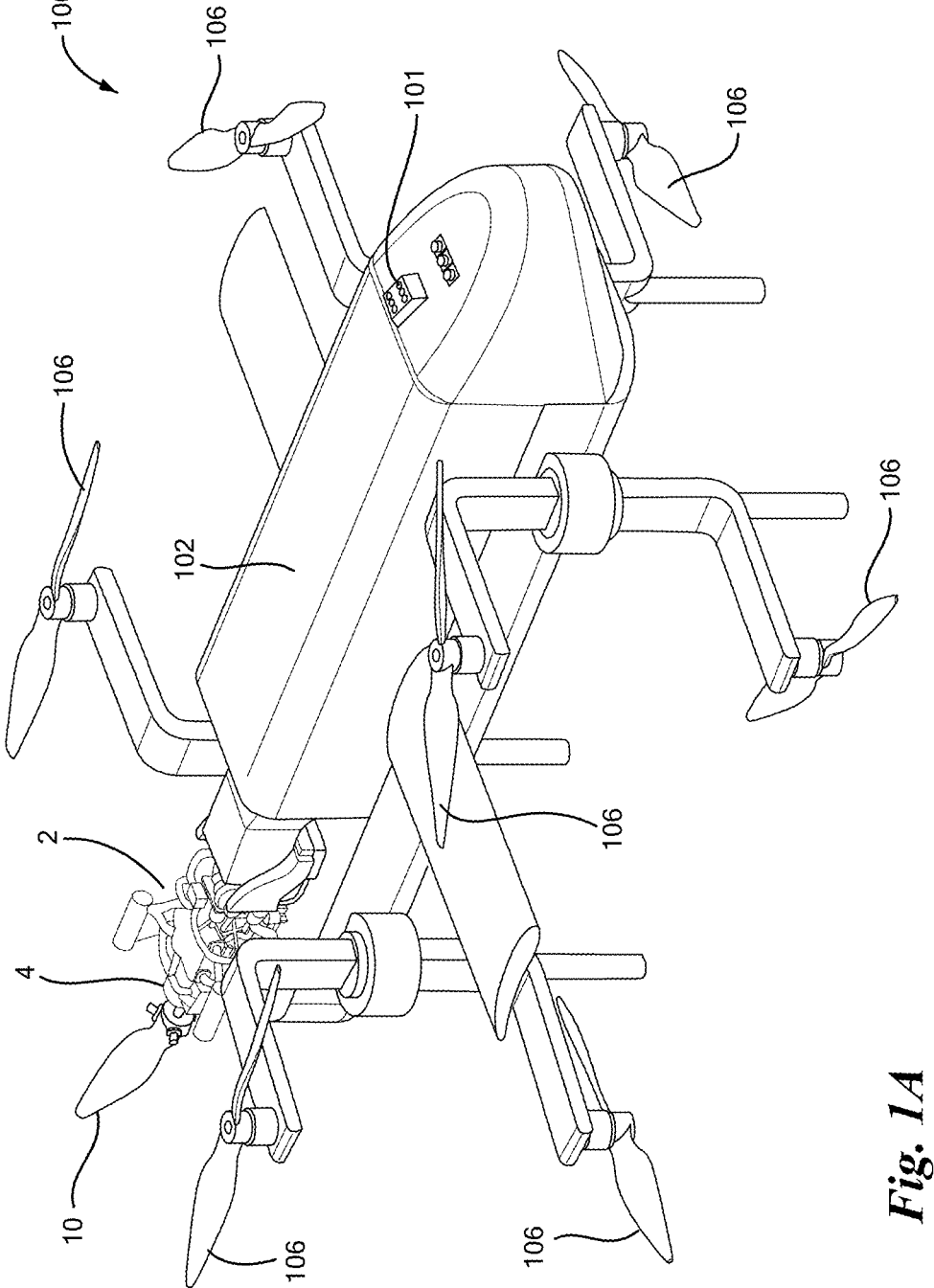
FIG. 1A is a modular mobile engine-generator vehicle, here, an unmanned aerial vehicle (UAV) engine-generator, in accordance with embodiments of the invention.

Definitions. As used in this description and the accompanying claims, the following terms shall have the meanings indicated, unless the context otherwise requires:

A "set" includes at least one member.

The terms "a" and "an" and "the" and similar reference used in the context of describing the invention (especially in the context of the claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. No language in the specification should be construed as indicating any non-claimed element essential to the practice of the invention.

A "rotating propulsion device" is a rotating component (configured to propel a vehicle) selected from the group consisting of a rotor, a wheel, a propeller, and combinations of the forgoing, coupled to a set of motors.

A "motor" is a device producing rotational power using power supplied by a source selected from the group consisting of electricity, a fuel, and combinations thereof.

An "engine," e.g., an internal combustion engine, is a machine that converts a fuel input into a mechanical power output. In some embodiments, the engine is a rotary engine. In some embodiments, the rotary engine is an "X-engine," embodiments of which are disclosed in U.S. Pat. No. 8,523, 546, hereby incorporated by reference herein in its entirety.

An "alternator" is a device that converts a mechanical rotating input (mechanical power) into an electrical power output. An alternator can optionally be configured to convert an electrical power input into a mechanical rotational power output. An alternator may also interchangeably be referred to as an "electric motor/generator."

An "engine-generator," "generator set," or "genset" is a system including an alternator and an engine, coupled to the alternator, to cause the alternator to generate electricity. The engine's fuel input is converted to a mechanical power output, which serves as mechanical power input for the alternator, which in turn converts the mechanical power input into electricity.

A "load" is an electrical component or portion of a circuit that consumes electrical power. An "external load," as used herein, refers to a load that is separate and physically distinct from a mobile engine-generator vehicle and that does not travel with the mobile engine-generator vehicle. Examples of an external load include an appliance or electrical component present on land, in water, in the air, on a ship deck, and the like.

An "external fuel source" is a fuel source that is separate and physically distinct from a mobile engine-generator vehicle and that does not travel with the mobile engine-generator vehicle.

A "mobile engine-generator vehicle" is a mobile vehicle comprising a generator-engine, wherein the generator-engine is configured to (i) power the vehicle's mobility and (ii) generate electrical power to an external load. Thus, a mobile engine-generator vehicle may travel, e.g., fly itself from a first location to a second location, powered by the engine-generator. Once at the second location, the mobile engine-generator vehicle may provide electrical power, generated by the engine-generator, through an electrical outlet to an external load at the second location. A mobile engine-generator vehicle may be an aircraft, a watercraft, or a land vehicle. The mobile engine-generator may be manned or unmanned.

FIG. 1A is a mobile engine-generator vehicle—here, a modular UAV engine-generator, in accordance with embodiments of the invention. The UAV engine-generator is merely exemplary, and it will be understood by those of ordinary skill in the art that a mobile engine-generator vehicle, in accordance with embodiments of the invention, includes manned or unmanned (i) aircraft, (ii) watercraft, and (iii) land vehicles.

UAV engine-generator ("UAV genset") 100 comprises fuselage 102, within which is contained a fuel source and, optionally, an internal rechargeable battery and other mechanical and electrical components. Briefly, the fuel source provides fuel to internal combustion engine 2, which may provide mechanical power to a set of rotating propulsion devices, e.g., propeller 10. Mechanical power from internal combustion engine 2 may further provide mechanical power to electric motor/generator 4, which, when operating in generator mode, may provide electricity to components of UAV genset 100 and to an external load through electrical outlet 101 shown mounted to fuselage 102. Electrical outlet 101 may be covered while UAV genset 100 is in flight, and may be a male outlet (configured to receive a female plug) or a female outlet (configured to receive a male plug). UAV genset 100 may be flown to a destination to provide electricity to an external device present at the destination (the device being an external load). Electrical power may be provided to the device when the device is electrically coupled to outlet 101. In addition, outlet 101 may be electrically coupled to an internal rechargeable battery, comprised by the mobile engine-generator vehicle, and configured to receive electrical power from an external electrical power source and deliver the received electrical power to the internal rechargeable battery, thereby recharging the internal rechargeable battery. UAV genset 100 further comprises optional vertical take-off and landing (VTOL) propellers 106. In some embodiments, a UAV engine generator may not include VTOL propellers. The UAV genset of FIG. 1A is merely exemplary and it is contemplated as part of the present disclosure that an internal combustion engine of a UAV genset may provide mechanical power to any rotating propulsion device of the UAV genset, including VTOL propellers. A more detailed overview of various components of UAV genset 100, as well as their function, is provided by FIG. 2 and its description, below.

Figure 1B:
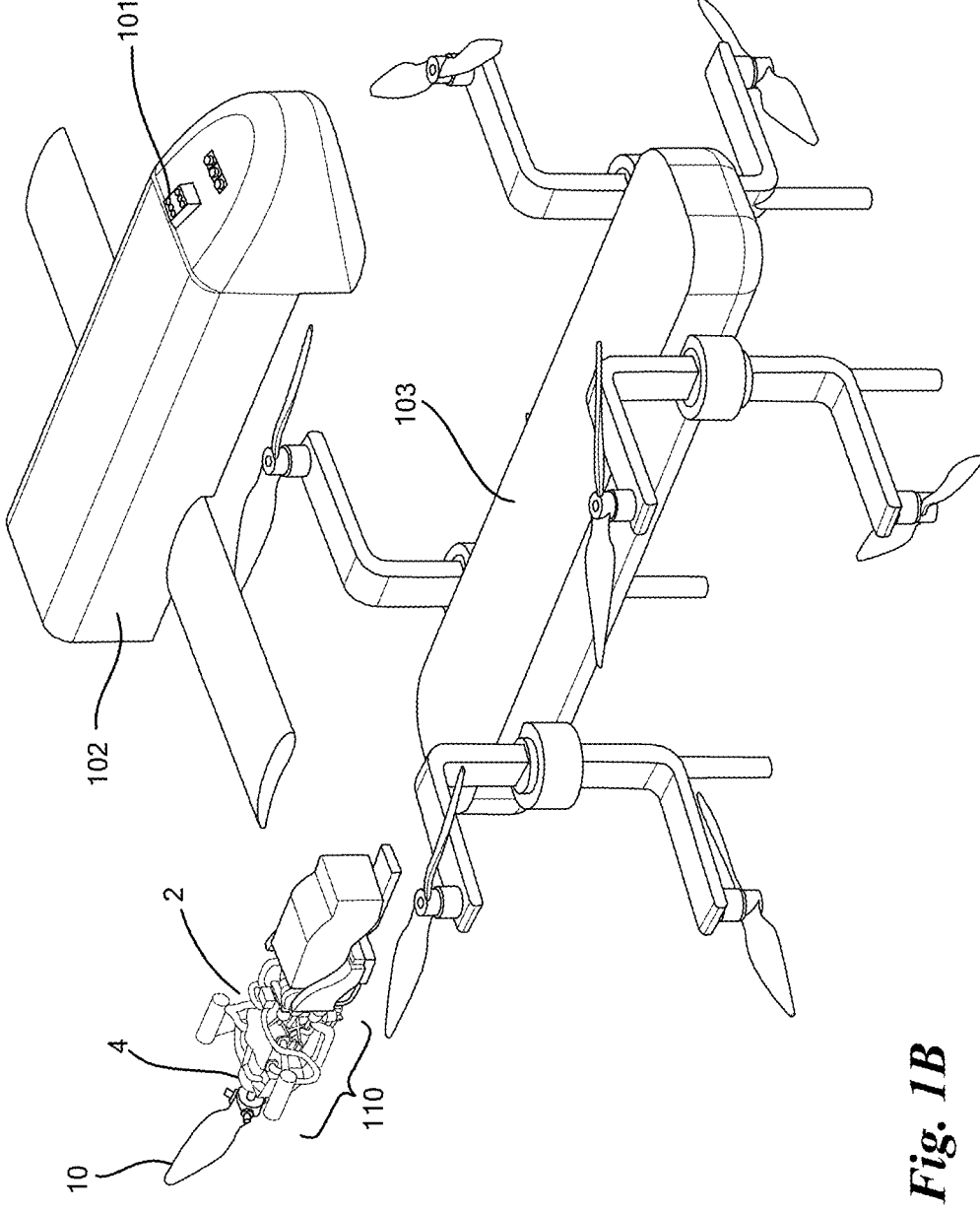
FIG. 1B is an exploded view of the UAV engine-generator of FIG. 1A, in accordance with embodiments of the invention.

FIG. 1B shows an exploded view of the UAV genset 100 of FIG. 1A. The modular design of UAV genset 100 allows different modular components, e.g., genset 110 modules, to be paired onto frame 103 with different fuselage 102 modules and components contained therein.

Figure 1C:
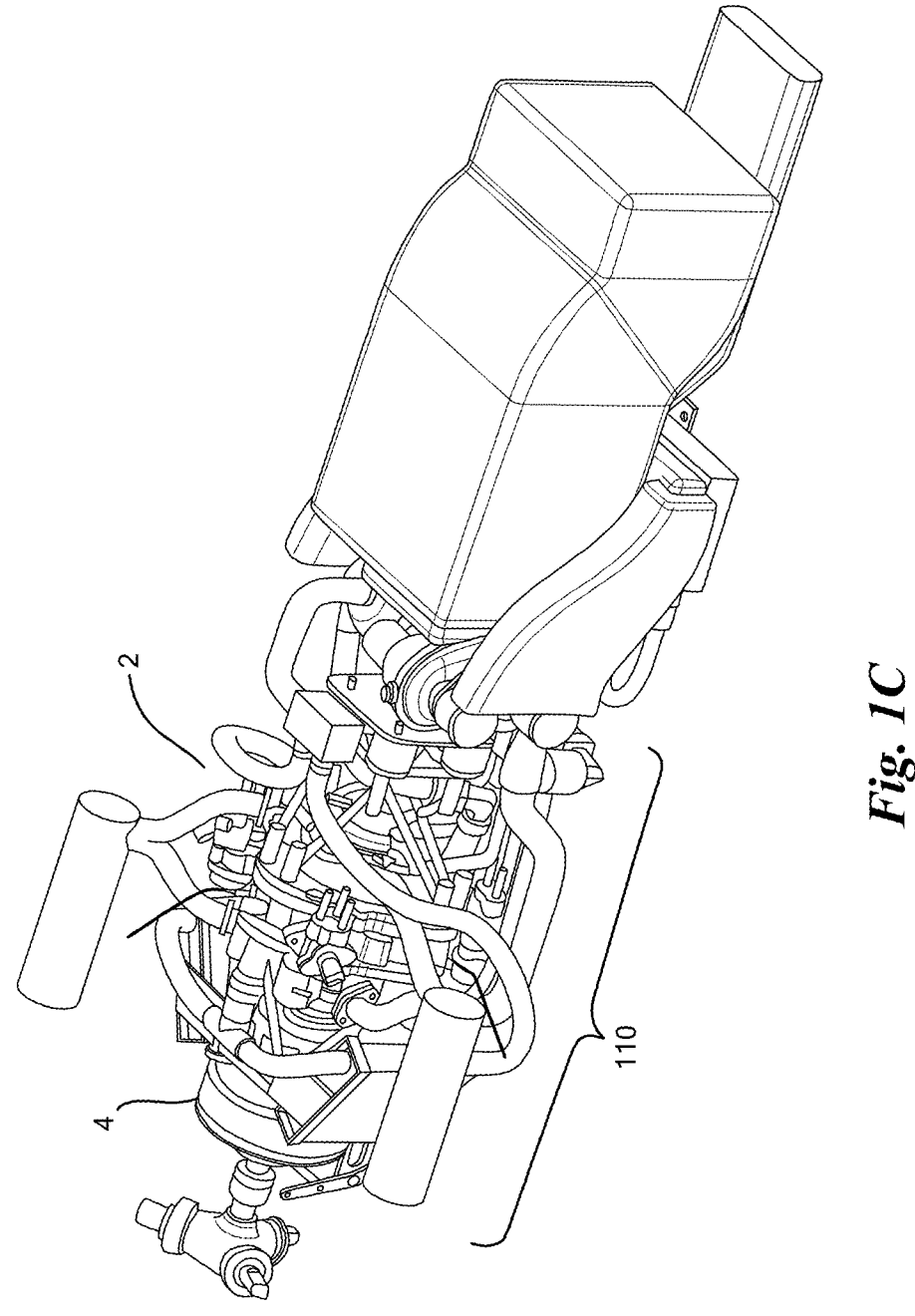
FIG. 1C is a genset module of the UAV engine-generator of FIG. 1A, in accordance with embodiments of the invention.

FIG. 1C shows a genset module including genset 110, comprising internal combustion engine 2 and electric motor/generator 4, in accordance with embodiments of the invention. Genset 110 is shown in FIGS. 1A and 1B coupled to propeller 10.

Figure 1D:
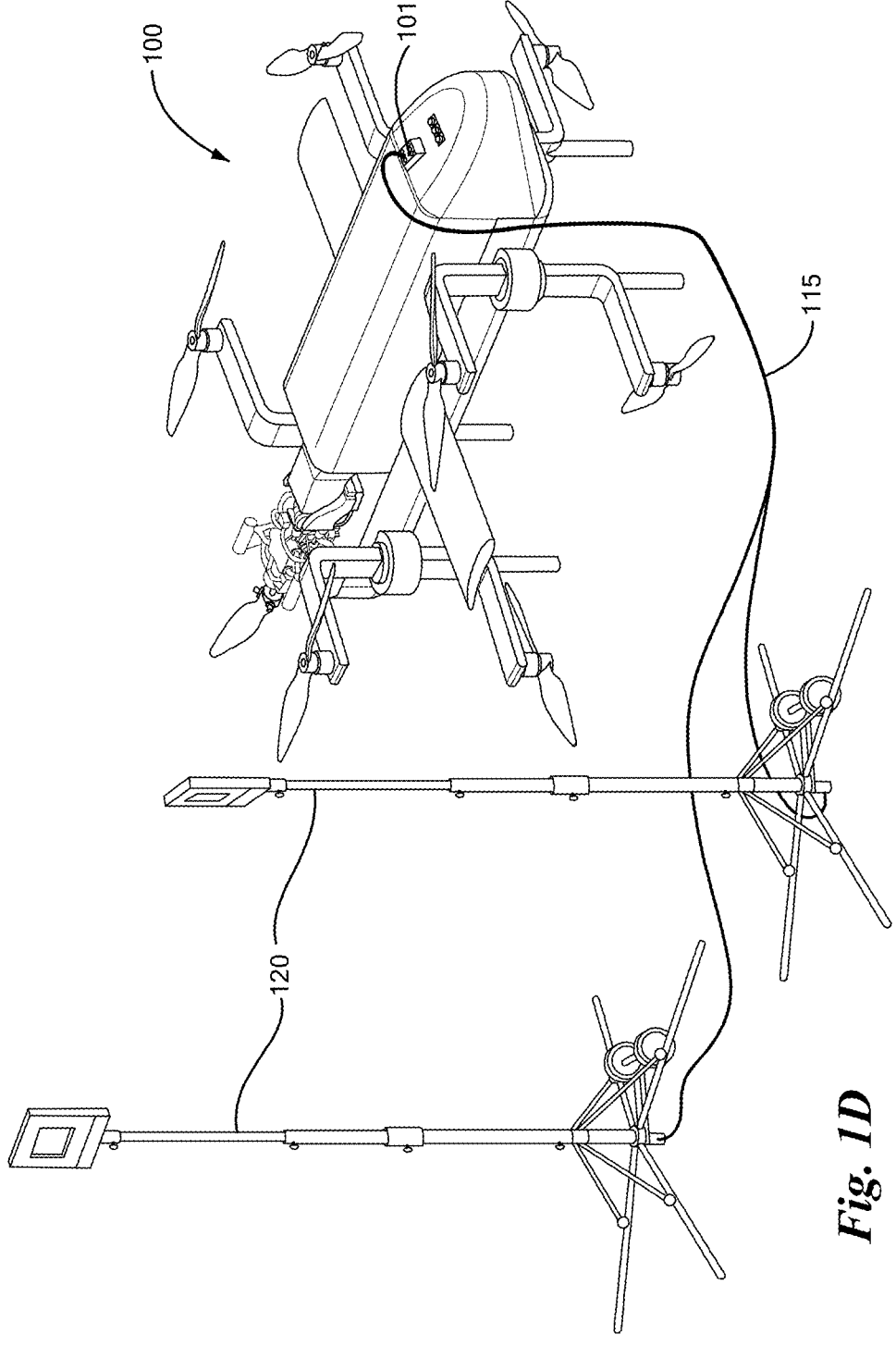
FIG. 1D shows a UAV engine-generator providing electrical power to an external load via an electrical outlet mounted on the UAV engine-generator, in accordance with embodiments of the invention.

FIG. 1D shows UAV genset 100 providing electrical power to external load 120 through electrical coupling 115, which is plugged in to outlet 101. Once UAV genset 100 lands at a destination where an external load is present, UAV genset 100, operating in generator mode, provides electrical power through outlet 101 to external load 120 via electrical coupling 115. In some embodiments, a sensor may be coupled to electrical outlet 101 and configured to detect a presence of the external load on electrical outlet 101. In some embodiments, a controller may be coupled to the sensor and configured to inhibit operation of a set of rotating propulsion devices, such as propeller 10, if the external load has been detected as present. In some embodiments, internal combustion engine 2 may be coupled to a set of rotating propulsion devices, such as propeller 10, via a clutch. The clutch may be configured to be decoupled from internal combustion engine 2 if electrical outlet 101 is providing electrical power to an external load. Such configurations prevent the landed UAV genset from taking off while it is delivering electrical power.

In some embodiments, a mobile engine-generator vehicle may comprise a human control interface coupled to a controller and configured to allow a user to select an operation mode selected from the group consisting of (i) a mode whereby the electrical outlet of the mobile engine-generator vehicle is configured to provide electrical power, therethrough, to an external load, (ii) a mode whereby the electrical outlet is configured to receive electrical power from an external electrical power source and recharge an internal rechargeable battery comprised by the mobile engine-generator vehicle; (iii) a mode whereby the engine provides power to the set of rotating propulsion devices; and (iv) a mode whereby the mobile engine-generator vehicle is powered down.

In some embodiments, the mobile engine-generator vehicle is selected from the group consisting of an aircraft, a watercraft, and a land vehicle. In some embodiments, the mobile engine-generator vehicle is manned. In some embodiments, the mobile engine-generator vehicle is unmanned.

Figure 2:
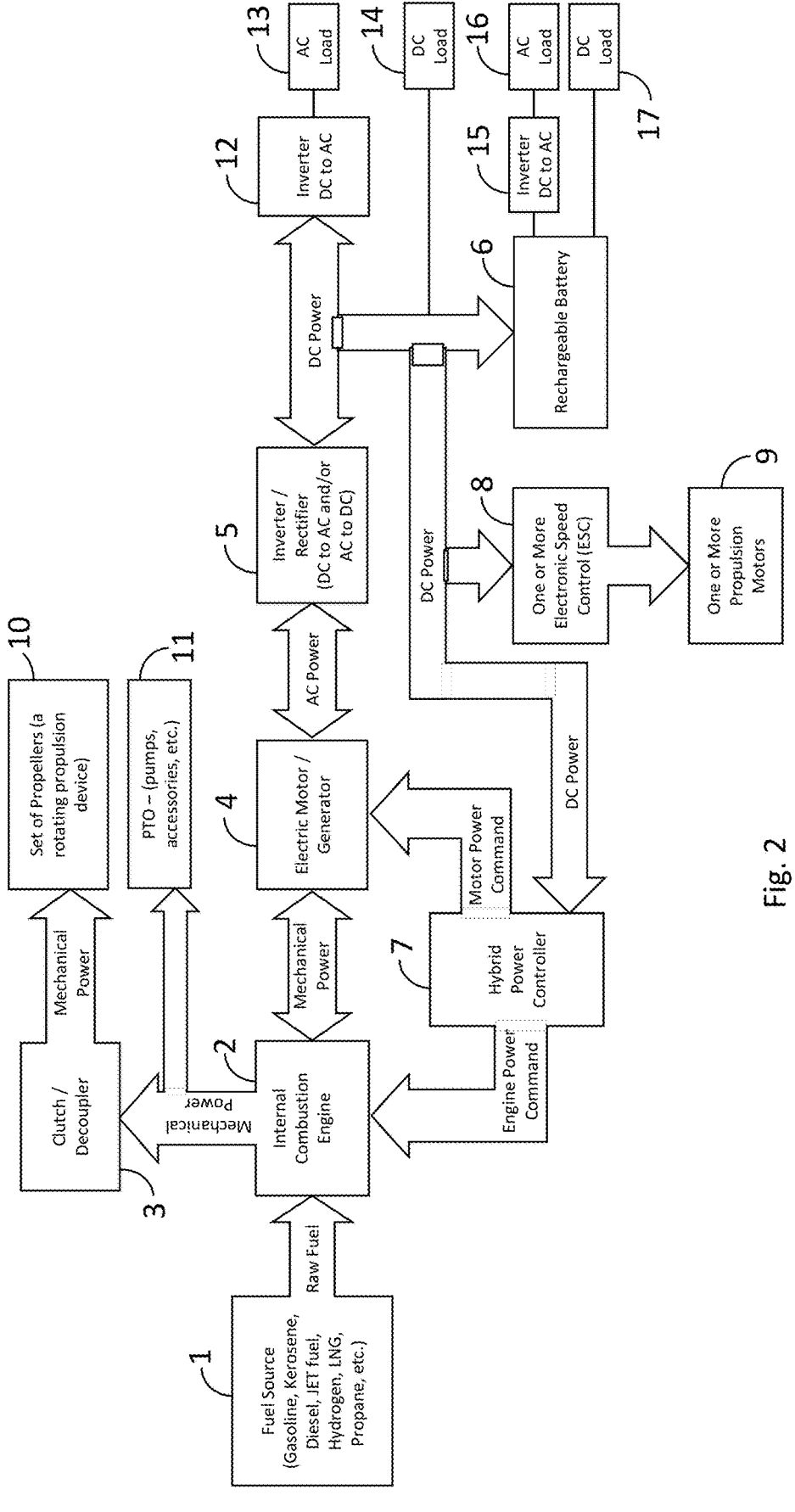
FIG. 2 is a block diagram of a parallel hybrid power system for a UAV engine-generator, in accordance with embodiments of the invention.

FIG. 2 is a block diagram of a parallel hybrid power system for a UAV engine-generator. It will be understood to one of skill in the art that the UAV engine-generator of FIG. 2 is merely exemplary, and that the parallel hybrid system may be applied to a mobile engine-generator vehicle as disclosed herein, e.g., a manned or unmanned aircraft, watercraft, or land vehicle. The system includes fuel source 1, which provides fuel to internal combustion engine 2. The fuel may be contained in a fuel storage device and the fuel may be gasoline, diesel, kerosene, jet fuels, military specification fuels, hydrogen, propane, or any other suitable fuel known to one of skill in the art, now and in the future. Internal combustion engine 2 uses the fuel provided by fuel source 1 to generate mechanical energy. The mechanical energy may be transmitted to (i) clutch 3, (ii) electric motor/generator 4, (iii) power take-off (PTO) components 11, and (iv) combinations of the foregoing.

Clutch 3 transmits mechanical energy to set of propellers 10, which may include propeller adjustment features, e.g., a variable pitch control mechanism. Clutch 3 may be configured to partially or fully decouple internal combustion engine 2 from propeller 10 and/or PTO components 11. Internal combustion engine 2 is also coupled to electric motor/generator 4 via a connection suitable for transmitting mechanical power, e.g. a mechanical connection, a hydraulic viscous connection, a magnetic connection, or other connections known by one of skill in the art to transmit mechanical power. The connection may optionally provide capability for misalignment or load dampening.

Electric motor/generator 4 is configured to either convert mechanical energy created by internal combustion engine 2 to AC power, or convert AC power provided by inverter/rectifier 5 to mechanical power. Electric motor/generator 4 may provide AC power to inverter/rectifier 5, whereby it is transformed into DC power that may be transmitted to various components in the system, as shown. When electric motor/generator 4 uses AC power from the inverter/rectifier 5 as input, converting it to mechanical energy, the resulting mechanical energy may be used to start internal combustion engine 2 and/or to provide additional mechanical power to clutch 3 via the engine's connection to clutch 3.

DC power, as shown, may power hybrid power controller 7, which provides power commands to both internal combustion engine 2 and electric motor generator 4 based upon system needs. DC power, as shown, may also be transmitted to one or more electronic speed controllers 8 that provides power to one or more propulsion motors 9. DC power, as shown, may also be transmitted to internal rechargeable battery 6. Internal rechargeable battery 6 may supply power to inverter 15 for DC to AC conversion, which is then connected to AC load 16. Internal rechargeable battery 6 may also be connected to DC load 17. DC power produced by inverter/rectifier 5 may also be converted to AC power by inverter 12 to power AC load 13. DC power may be directly supplied to DC load 14, as shown. Electrical power may be delivered to loads 13, 14, 16, and 17 through an electrical outlet (not shown) mounted to the UAV engine-generator.

DC power may also flow from internal rechargeable battery 6 to the inverter/rectifier 5, and then to electric motor/generator 4 to ultimately provide additional mechanical power to internal combustion engine 2. Each component connected to DC power is able to receive and/or provide DC power as is required for its function. If the required load is greater than the power provided by inverter/rectifier 5, internal rechargeable battery 6 can provide additional power as required.

In some embodiments, a mobile engine-generator vehicle includes a siphon coupled to a fuel inlet, the fuel inlet being coupled to the engine of the mobile engine-generator vehicle, wherein the siphon is configured to siphon fuel from an external fuel source through the fuel inlet, thereby providing siphoned fuel to the engine while electrical power is provided to an external load through the mobile engine-generator's electrical outlet. The fuel inlet may be coupled to the engine via an internal fuel source of the mobile engine-generator, for example an internal fuel tank of the mobile engine-generator vehicle.

In other embodiments, the electrical outlet disclosed herein may be substituted with a power output means selected from the group consisting of an inductive coil and an electromagnetic field generator. The electromagnetic field may be a microwave or a laser. The power outlet means is configured to wirelessly transmit energy to an external load having a receiver configured to receive the energy wirelessly transmitted from the power output means and convert the received energy into electrical energy.

Various embodiments of the present invention may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

Without limitation, potential subject matter that may be claimed (prefaced with the letter "P" so as to avoid confusion with the actual claims presented below) includes:

P1. An improved mobile engine-generator vehicle of the type having a set of rotating propulsion devices, wherein the improvement comprises:

an electrical outlet, mounted to the mobile engine-generator vehicle and configured to supply electricity therethrough to an external load, and an engine-generator, comprising an engine and an alternator, configured to supply an electrical power output to the electrical outlet, and also to supply power to a member of the set of rotating propulsion devices.

P2. A mobile engine-generator vehicle comprising:

a body;

a set of rotating propulsion devices coupled to the body;

a set of alternators, each configurable as a motor to drive the set of rotating propulsion devices;

an engine configurable to drive a member selected from the group consisting of the set of rotating propulsion devices, at least one member of the set of alternators, and combinations thereof;

and an electrical outlet, mounted to the body, and coupled to at least one member of the set of alternators, so as to supply electricity therethrough to an external load when the set of alternators is configured to generate electricity.

P3. The mobile engine-generator vehicle according to any one of the preceding potential claims, further comprising:

a sensor coupled to the electrical outlet and configured to detect a presence of the external load on the electrical outlet; and a controller coupled to the sensor and configured to inhibit operation of the set of rotating propulsion devices if the external load has been detected as present.

P4. The mobile engine-generator vehicle according to any one of the preceding potential claims, further comprising an internal rechargeable battery coupled to the electrical outlet.

P5. The mobile engine-generator vehicle of potential claim P4, wherein the electrical outlet is configured to receive electrical power from an external electrical power source, thereby recharging the internal rechargeable battery.

P6. The mobile engine-generator vehicle according to any one of the preceding potential claims, comprising:

a human control interface coupled to a controller and configured to allow a user to select an operation mode selected from the group consisting of (i) a mode whereby the electrical outlet is configured to provide electrical power, therethrough, to the external load, (ii) a mode whereby the electrical outlet is configured to receive electrical power from the external electrical power source and deliver the received electrical power to the internal rechargeable battery; (iii) a mode whereby the engine provides power to the set of rotating propulsion devices; and (iv) a mode whereby the mobile engine-generator vehicle is powered down.

P7. The mobile engine-generator vehicle according to any one of the preceding potential claims, wherein the set of rotating propulsion devices is selected from the group consisting of a propeller, a rotor, a wheel, and combinations thereof.

P8. The mobile engine-generator vehicle according to any one of the preceding potential claims, wherein the engine is configured to drive the set of rotating propulsion devices through a clutch coupled to the engine.

P9. The mobile engine-generator vehicle of potential claim P8, wherein the clutch is configured to be decoupled from the engine if the electrical outlet is providing electrical power to the external load.

P10. The mobile engine-generator vehicle according to any one of the preceding potential claims, wherein the mobile engine-generator vehicle is selected from the group consisting of an aircraft, a watercraft, and a land vehicle.

P11. The mobile engine-generator vehicle according to any one of the preceding potential claims, wherein the mobile engine-generator vehicle is manned.

P12. The mobile engine-generator vehicle according to any one of potential claims P1-P10, wherein the mobile engine-generator vehicle is unmanned.

P13. The mobile engine-generator vehicle according to any one of the preceding potential claims, further comprising a siphon coupled to a fuel inlet, the fuel inlet being coupled to the engine.

P14. The mobile engine-generator vehicle of potential claim P13, wherein the siphon is configured to siphon fuel from an external fuel source through the fuel inlet, thereby providing siphoned fuel to the engine while electrical power is provided to the external load through the electrical outlet.

P15. The mobile engine-generator vehicle according to any one of the preceding potential claims, wherein the mobile engine-generator vehicle comprises modular components.

While the invention has been particularly shown and described with reference to specific embodiments, it will be understood by those skilled in the art that various changes in form and detail may be made therein without departing from the spirit and scope of the invention as defined by the appended clauses. While some of these embodiments have been described in the claims by process steps, an apparatus comprising a computer with associated display capable of executing the process steps in the clams below is also included in the present invention. Likewise, a computer program product including computer executable instructions for executing the process steps in the claims below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A mobile engine-generator vehicle comprising:

a body;

a set of rotating propulsion devices coupled to the body;

a set of alternators, each configurable as a motor to drive the set of rotating propulsion devices;

an engine configurable to drive a member selected from the group consisting of the set of rotating propulsion devices, at least one member of the set of alternators, and combinations thereof;

and an electrical outlet, mounted to the body, and coupled to at least one member of the set of alternators, so as to supply electricity therethrough to an external load when the set of alternators is configured to generate electricity.

2. The mobile engine-generator vehicle according to claim 1, further comprising:

a sensor coupled to the electrical outlet and configured to detect a presence of the external load on the electrical outlet; and a controller coupled to the sensor and configured to inhibit operation of the set of rotating propulsion devices if the external load has been detected as present.

3. The mobile engine-generator vehicle of claim 1, further comprising an internal rechargeable battery coupled to the electrical outlet.

4. The mobile engine-generator vehicle of claim 3, wherein the electrical outlet is configured to receive electrical power from an external electrical power source, thereby recharging the internal rechargeable battery.

5. The mobile engine-generator vehicle of claim 1, comprising:

a human control interface coupled to a controller and configured to allow a user to select an operation mode selected from the group consisting of (i) a mode whereby the electrical outlet is configured to provide electrical power, therethrough, to the external load, (ii) a mode whereby the electrical outlet is configured to receive electrical power from the external electrical power source and deliver the received electrical power to the internal rechargeable battery; (iii) a mode whereby the engine provides power to the set of rotating propulsion devices; and (iv) a mode whereby the mobile engine-generator vehicle is powered down.

6. The mobile engine-generator vehicle of claim 1, wherein the set of rotating propulsion devices is selected from the group consisting of a propeller, a rotor, a wheel, and combinations thereof.

7. The mobile engine-generator vehicle of claim 1, wherein the engine is configured to drive the set of rotating propulsion devices through a clutch coupled to the engine.

8. The mobile engine-generator vehicle of claim 7, wherein the clutch is configured to be decoupled from the engine if the electrical outlet is providing electrical power to the external load.

9. The mobile engine-generator vehicle of claim 1, wherein the mobile engine-generator vehicle is selected from the group consisting of an aircraft, a watercraft, and a land vehicle.

10

10. The mobile engine-generator vehicle of claim 1, wherein the mobile engine-generator vehicle is manned.

11. The mobile engine-generator vehicle of claim 1, wherein the mobile engine-generator vehicle is unmanned.

12. The mobile engine-generator vehicle of claim 1, further comprising a siphon coupled to a fuel inlet, the fuel inlet being coupled to the engine.

13. The mobile engine-generator vehicle of claim 12, wherein the siphon is configured to siphon fuel from an external fuel source through the fuel inlet, thereby providing siphoned fuel to the engine while electrical power is provided to the external load through the electrical outlet.

14. The mobile engine-generator vehicle of claim 1, wherein the mobile engine-generator vehicle comprises modular components.

* * * * *